(12) United States Patent
Moore

(10) Patent No.: US 11,065,746 B2
(45) Date of Patent: Jul. 20, 2021

(54) METHOD FOR CLAMPED JOINT SEATING DETECTION

(71) Applicant: General Electric Company, Schenectady, NY (US)

(72) Inventor: Donald Owen Moore, Wilmington, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/621,455

(22) Filed: Jun. 13, 2017

(65) Prior Publication Data
US 2018/0354106 A1 Dec. 13, 2018

(51) Int. Cl.
| B25B 23/14 | (2006.01) |
| G06F 17/10 | (2006.01) |
| G01L 5/24 | (2006.01) |
| G06F 17/18 | (2006.01) |

(52) U.S. Cl.
CPC ............. *B25B 23/14* (2013.01); *G01L 5/24* (2013.01); *G06F 17/10* (2013.01); *G06F 17/18* (2013.01); *Y10T 29/49766* (2015.01)

(58) Field of Classification Search
CPC ............ G06F 17/10; B25B 23/14; G01L 5/24
See application file for complete search history.

(56) References Cited

U.S. PATENT DOCUMENTS

| 4,161,220 | A | * | 7/1979 | Carlin | ............... | B25B 23/14 |
| | | | | | | 173/1 |
| 4,241,488 | A | * | 12/1980 | Eshghy | ............... | B23P 19/066 |
| | | | | | | 173/183 |
| 4,305,471 | A | | 12/1981 | Eshghy | | |
| 4,849,741 | A | | 7/1989 | Thomas | | |
| 5,131,130 | A | * | 7/1992 | Eshghy | ............... | B25B 23/14 |
| | | | | | | 29/407.02 |
| 5,407,265 | A | | 4/1995 | Hamidieh et al. | | |
| 7,139,705 | B1 | * | 11/2006 | Beerends | ............ | G10L 25/69 |
| | | | | | | 704/237 |
| 2009/0294692 | A1 | * | 12/2009 | Bourke, Jr. | ......... | A23L 3/26 |
| | | | | | | 250/459.1 |
| 2013/0211413 | A1 | * | 8/2013 | Cattaneo | ............ | A61B 17/8875 |
| | | | | | | 606/104 |

FOREIGN PATENT DOCUMENTS

| GB | 2506705 | 9/2014 |
| WO | WO0147669 | 7/2001 |

OTHER PUBLICATIONS

Thiago R.F. Mendonça, Milena F. Pinto and Carlos A. Duque, Adjustable Window for Amplitude Estimation Considering the Time-Varying Frequency of Power Systems Signals, IEEE, 2015 IEEE 24th International Symposium on Industrial Electronics (ISIE) (Year: 2015).*
Extended European Search Report issued in corresponding European Application No. 18177204.7, dated Nov. 23, 2018.

* cited by examiner

*Primary Examiner* — Matthew G Marini
(74) *Attorney, Agent, or Firm* — Venable LLP; Elizabeth C. G. Gitlin; Michele V. Frank

(57) ABSTRACT

A method for filtering data derived from a process wherein the data is generated by an input of energy. The method includes these steps: collecting the data from the process to create a parent data set; creating a first window of data; calculating an average of the first window of data; comparing the average of the first window of data to a first threshold value; shifting the first window if the average has not passed the first threshold value; creating a second window of data from the parent data set; calculating an average of the second window of data; comparing the average of the second window of data to the threshold value; shifting the second window if the average of the second window of data has not passed the threshold value; and confirming that the threshold value has been reached if the second window average has passed the threshold value.

18 Claims, No Drawings

METHOD FOR CLAMPED JOINT SEATING DETECTION

BACKGROUND OF THE INVENTION

The present invention relates to a method for locating a predetermined point on a mathematical curve developed from noisy data and more specifically to a method utilizing tiered moving averages to determine when a clamped joint is seated.

Mechanical processes, such as a process of tightening a fastener, can generate noisy data. For example, as a fastener is tightened the signal-to-noise ratio can be less than desirable in signals indicating torque. As used herein, the term "signal-to-noise ratio" refers to a ratio that compares the level of a desired signal that is directly related to the value desired to be measured, i.e., torque, to the level of background noise. The background noise is not directly related to the torque or angle to be measured. Higher signal-to-noise ratios result in less accurate measurement of torque.

It is known to monitor primary data related to torque to determine the seating point. One problem with monitoring primary data is that calculations made with the primary data amplify the effect of noise associated with the primary data. Therefore, the advantage of using such a calculation to determine satisfactory tightening can be obscured by disadvantages associated with increased noise levels.

BRIEF DESCRIPTION OF THE INVENTION

This problem is addressed by a method for using a first average derived from a parent data set to determine when a threshold value has been reached and using a second average derived from the parent data set to confirm that the threshold value has been reached.

According to one aspect of the technology described herein, a method is provided for filtering data derived from a process wherein the data is generated by an input of energy. The method includes these steps: collecting the data from the process to create a parent data set; creating a first window of data; calculating an average of the first window of data; comparing the average of the first window of data to a first threshold value; shifting the first window if the average has not passed the first threshold value; creating a second window of data from the parent data set; calculating an average of the second window of data; comparing the average of the second window of data to the threshold value; shifting the second window if the average of the second window of data has not passed the threshold value; and confirming that the threshold value has been reached if the second window average has passed the threshold value.

DETAILED DESCRIPTION OF THE INVENTION

The disclosed technology provides a method for generally finding a point on a curve generated from noisy data. The point can be a predetermined point or threshold value. More specifically, the disclosed technology provides a method for analyzing noisy data generated in real time from a process where data is generated by an input of energy, such as a mechanical, chemical, or electrical process. For example, the method disclosed herein can be used for determining when a mechanically fastened clamped joint is sufficiently tightened such that it is seated but has not been over tightened such that it has entered a failure mode.

Referring now to general operation of the method, data is collected in real time and stored such that the data can be reevaluated as necessary in successively narrower and narrower windows. As used herein, the term "window" refers to a data set that includes data within a predetermined range of independent variables. The method provides a tiered approach to analyzing data. In each tier, the data is reviewed with successively greater granularity.

In a first tier, the largest window which covers the greatest range is used to analyze the data with the least granularity. In a second tier, a smaller window is used to reanalyze the data of the last window of the first tier. In a third tier an even smaller window is used to reanalyze the data of the last window of the second tier. Thus increasingly smaller windows are used to refine information related to the location of the threshold value. This can continue until a smallest window which includes only two data points. If the threshold value is between the two data points, interpolation can be used to determine more precisely which input variable value with which the threshold value is associated.

Referring now to a more particular description of the method, in a first step the collecting of data is begun. Each data point is associated with an independent variable such as time, angle, or the like and stored to form a parent data set PS. In a second step, data within the first window is averaged. In other words, data that is bounded by an upper independent variable value and a lower independent variable value is averaged. The resulting average value is compared to the predetermined value, i.e. the threshold value. The purpose of the comparison is to determine whether the resulting average value equals or has passed the threshold value. As used herein, the term "passed" refers to the occurrence of either data values being higher than the threshold value where previous values were lower in the case of generally increasing data or data values being lower than the threshold value where previous values were higher in the case of generally decreasing data.

If the resulting average of the first window has not reached or passed the threshold value, then the first window is shifted. In effect, when the first window is shifted, the oldest data is dropped from the window and the newest data is added to the window. When the method is being applied to real-time process data, the newest data is generally the current value most recently received from the process.

If the average value of the first window has reached or passed the predetermined value, then it can be concluded that the predetermined value occurred within the range of independent variables included within the first window. Accordingly, the first tier analysis is concluded and second tier analysis is begun to more accurately determine the location of the predetermined value.

In the second tier, a second window includes a smaller range of data than the first window. The second window is positioned such that the second window includes the oldest data point of the first window and older data points. It should be appreciated that the older data points were not included within the first window.

The data is analyzed with the second window as described above with regards to the first window. Data within the second window is averaged and compared to the predetermined value. If the second window average has not reached the predetermined value, the second window is incremented, i.e. moved up one data point, and the resulting new group of data is averaged. This average is compared to the predetermined value. If the predetermined value has not been crossed, the incrementing of the second window is continued until it has. Thus a more precise location of the predetermined value is determined.

The location of the predetermined value can be better understood by repetition of the method described above using an even narrower third window and subsequent, progressively narrower windows. Use of narrower and narrower successive windows can continue until the range of the narrowest window includes only two independent variables.

A hypothetical example of use of the method above will now be described with regards to tightening a fastener of a clamped joint. The point at which the clamped joint is seated, referred to herein as "the seating point," can be indicated by the inflection point of a curve indicating torque rate versus angle. A plot of torque acceleration versus the angle further amplifies the change in signal around the seating point relative to torque versus angle. However, utilization of a plot of torque rate versus angle to determine whether an actual seating point has occurred is difficult because signal noise associated with plotting torque rate versus the angle can obscure the seating point. This effect can be even greater when plotting torque acceleration versus the angle. According to one embodiment, the signal monitored is related to torque vs. angle. In other embodiments, the monitored signals could relate to variables other than torque and angle.

The method utilizes tiered averages to more clearly distinguish value changes, such as differences in slope, that are evident when comparing a section of the curve prior to the seating point with the section of curve after the seating point. The location along the curve at which the value changes can be difficult to detect as the mechanical process is occurring due to signal noise.

To utilize the method disclosed herein, a mechanical process such as tightening is conducted. Data generated from the process is collected, for example using one or more sensors. According to the illustrated embodiment, an apparatus (not shown) for tightening a clamped joint (not shown), for example including one or more threaded fasteners, and the clamped joint are provided. For example, one or more torquing tools such as a manual or powered wrench or driver (not shown) may be used. The apparatus is associated with a computer processor such that data points related to torque and angle can be collected. The computer processer also includes storage means to retain at least one data set of multiple data points. The data set can be manipulated mathematically as a whole or as subsets.

Data is collected in a parent data set PS as paired points that include values representing torque (dependent variable) and angle (independent variable). Data is collected as the fastener is tightened. The data that makes up parent data set PS can be collected at a generally predetermined interval. However this interval might vary due to such factors as missed data points. As a result, data within a data set can be distributed evenly across a range of angles or unevenly across the range of angles. As the fastener is tightened, i.e. rotated, the parent data set PS is maintained by the computer processor. The parent data set PS developed during a tightening sequence retains each sequential data pair collected. Thus the parent data set PS of the illustrated embodiment might not include a predetermined number of data pairs and the interval between the data pairs might vary.

For the purposes of detecting the seating point of a clamped joint, the rate of change in torque versus change in angle, i.e., first derivative, is calculated between adjacent data pairs as the parent data set PS is collected. As a result, a series of first derivatives, where each first derivative is represented by point-to-point slope, is generated. To generate this series of first derivatives, the differences, or change, in torque values and angle values is determined. Next, the change in torque is divided by the change in angle to arrive at the first derivative of torque (T) with respect to angle (A). The first derivative for data pair i can be expressed mathematically as:

$$D'_i = \frac{T_i - T_{(i-1)}}{A_i - A_{(i-1)}}.$$

As each first derivative is determined, the new first derivative at the current angle is averaged with the previous first derivatives over a specified angle span AN1 of the independent variable, i.e., first window. The angle span AN1 is a range of angles that originates at the current angle i and extends a predetermined number of degrees back. For example: where the angle span AN1 equals 8 degrees, the parent data set includes data that has been collected at each degree from 1 to 20, and the current angle is 20, the first window includes the seven first derivatives between the data at 13, 14, 15, 16, 17, 18, 19, and 20 degrees. Values within the first window are then averaged to generate a first average AVG1 of first derivatives. The resulting first tier average AVG1 is compared to a first threshold value TV1. It should be appreciated that the first threshold value TV1 is chosen to indicate where the seating point has been passed according to one embodiment.

By comparing the resulting first window average AVG1 to the first threshold value TV1, it can be determined whether the seated region represented by the threshold value TV1 has been reached. In this regard if the first tier average AVG1 does not meet or exceed the first threshold value TV1, the next data point is collected and a new first tier average AVG1 is determined. If the first tier average AVG1 does meet or exceed the threshold value TV1, an initial determination that the seating point has been reached can be made.

A more precise location of the threshold value TV1, i.e., which angle threshold value TV1 is associated with, can be determined by utilizing a second-tier calculation as described above. In the second-tier calculation, a second window is utilized for analysis of the parent data set. In the second-tier an initial second window includes the first data point within the first window and preceding data points. Data within the second window is averaged and compared to the threshold value TV1 to determine whether it meets or exceeds the threshold value TV1. The second window average AVG2 is calculated as described above with regards to AVG1. The second angle span AN2 of the second window is smaller than the first angle span AN1 of the first window. This process can be continued successive tiers with successively smaller windows and angle spans AN3, AN4, etc. Alternatively, the process can be stopped after a predetermined number of the iterations such as after the third tier average is determined.

When the process of determining tiered averages is stopped, the range past the seating point can be identified as locations on the curve where the final window average equals or exceeds the threshold value TV1. If the final window average exceeds the threshold value TV1 then the seating point can be more precisely determined by interpolating between the point where the first threshold value TV1 is exceeded and the previous point.

A restatement of the disclosed process to determine or locate the predetermined point TV1 from a noisy data set follows. As the fastener is tightened, the following steps are conducted: (A) collecting and analyzing the parent data set PS and processing it to calculate first derivatives; (B) determining in a first-tier the first window average of first derivatives AVG1; (C) comparing the first tier average AVG1 to the first threshold value TV1 (D) repeating steps B and C until the first window average AVG1 has passed the threshold value TV1; (E) calculating in a second tier at least one second window average AVG2 when the first tier average AVG1 is greater than the first threshold value TV1; (F) comparing the second tier average AVG2 to the threshold value TV1; and (G) confirming that the fastener is seated when the second tier average AVG2 is greater than the threshold value TV1. It is noted that further steps of calculating a third tier average AVG3 and higher can be added as described above to further verify the seating point.

According to an alternative method of filtering data, whether the seating point has been passed or obtained can be further confirmed by use of second derivatives and filtering as follows. The first derivatives associated with each data point are calculated as described above. Each first derivative is averaged with the previous first derivatives over a first window. This operation results in a first derivative average. After each first derivative average is calculated, a second derivative of torque based on point-to-point slope between adjacent first derivative averages Y1 is calculated. This is known as the second derivative of torque with respect to angle and can be averaged. The second derivatives can then be averaged and compared to a second derivative threshold value for further noise reduction.

The disclosed technology provides another method for filtering noisy data. According to this method, second derivatives are isolated from averaged first derivatives and the resulting second derivatives are averaged for being compared with a threshold value. This method can be used together with the tiered method described above to further confirm the location of a predetermined value. It should be appreciated that the following second derivative method can be used on a stand-alone basis to the data as well. Such a process would include the following steps: (A) collecting and analyzing a parent data set PS and processing it to calculate first derivatives; (B) averaging first derivatives within a first specified angle span associated with a current angle to generate a first derivative average; (C) determining the rate of change between the first derivative average associated with the current angle and a first derivative average associated with the previous angle to generate a second derivative of torque based on point-to-point slope between adjacent first derivative averages; (D) averaging second derivatives within a second specified angle span associated with a current angle to generate a second derivative average; and (E) comparing the resulting second derivative average to a second derivative threshold value.

The disclosed technology provides methods for filtering data to locate a value on a curve generated by data from a process such as a mechanical process. According to the illustrated embodiment this value can be a point used in the determination of whether a clamped joint is seated. This method includes the steps of collecting data that is more noisy than conventional data and analyzing it in tiers. In this way, a more accurate determination of the location of the value can be made in comparison with conventional methods. Regarding whether a clamped joint is seated, the disclosed method provides advantages over prior art methods which are limited to determining whether a clamped joint is seated using less precise data that is less likely to be noisy. This disclosed methods also provide a means for using second derivatives to detect when a joint is seated over prior art methods which are limited to first derivatives.

The foregoing has described a method for filtering noisy data and more specifically for determining when a clamped joint is seated. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for filtering data derived from a process wherein the data is generated by an input of energy, the method comprising the steps of:
   collecting the data from the process to create a parent data set that includes data points each having a dependent variable and an independent variable associated therewith;
   creating a first window of data from the parent data set, the first window spanning from a first data point to an end data point;
   calculating an average of the first window of data;
   comparing the average of the first window of data to a threshold value;
   shifting the first window if the average has not passed the threshold value and repeating the steps of calculating and comparing;
   creating a second window of data from the parent data set if the first window average has passed the threshold value, the second window being smaller than the first window and initially including the first data point of the first window and at least one data point preceding the first data point in time if the first window average has passed the threshold value;
   calculating an average of the second window of data;
   comparing the average of the second window of data to the threshold value;
   shifting the second window if the average of the second window of data has not passed the threshold value and repeating the steps of calculating an average of the second window and comparing the average of the second window to the threshold value;
   confirming that the threshold value has been reached if the second window average has passed the threshold value; and
   ceasing the input of energy after confirming that the threshold value has been reached.

2. The method according to claim 1, further comprising the step of analyzing the data of the parent data set as it is collected.

3. The method according to claim 2, further comprising the step of processing the data of the parent data set to calculate first derivatives of the dependent variables.

4. The method according to claim 3, wherein the average of the first window of data is based upon data that represent a first predetermined range of independent variables.

5. The method according to claim 4, wherein the average of the second window of data is based upon a second predetermined range of independent variables that is smaller than the first predetermined range of independent variables and at least overlaps the first predetermined range of independent variables.

6. The method according to claim 5, wherein an average of a third window of data is based upon a third predetermined range of independent variables that is smaller than the second predetermined range of independent variables and at least overlaps the second predetermined range of independent variables.

7. The method according to claim 6, wherein the second predetermined range of independent variables spans from a first data point to an end data point, and wherein the third window of data initially overlaps the first data point of the second predetermined range of independent variables.

8. The method according to claim 1, wherein the energy is mechanical energy.

9. The method according to claim 1, wherein the energy is chemical energy.

10. The method according to claim 1, wherein the energy is electrical energy.

11. A method for determining whether a process of tightening a clamped joint has been completed, the method comprising the steps of:
    collecting data from the process of tightening to form a first data set comprised of data points;
    calculating, for each pair of adjacent data points of the first data set, a first derivative between the adjacent data points;
    calculating a first tier average from the first data set, the first tier average being indicative of an average of the calculated first derivatives calculated between adjacent data points of the first data set;
    incrementing the first data set and repeating the calculating step if the first tier average is less than a threshold value, wherein when the first data set is incremented, an oldest data point is dropped from the first data set and a new data point is added to the first data set;
    calculating a second tier average if the first tier average is greater than the threshold value;
    determining that the process of tightening a clamped joint has been completed if the second tier average is greater than the threshold value;
    determining, if the second tier average is greater than the threshold value, a seating point of the clamped joint by interpolating between the second tier average and the first tier average; and
    ceasing the tightening of the clamped joint or applying an additional predetermined amount of tightening after confirming that the threshold value has been reached.

12. The method according to claim 11, wherein incrementing the first data set comprises calculating a first derivative for a new data point and repeating calculating the first tier average for the first data set using the calculated first derivative associated with the new data point.

13. The method according to claim 12, wherein the dependent variable represents torque and the independent variable represents angle.

14. The method according to claim 11, further comprising:
    when the first tier average is greater than the threshold value, creating a second window that shares at least one data point with the data points of the first data set and includes at least two data points of the data; and
    calculating a first derivative for each of the at least two data points,
    wherein the second tier average is indicative of an average of the calculated first derivatives associated with the at least two data points.

15. The method according to claim 11, wherein the first tier average is based upon data pairs that represent a first predetermined range of independent variables.

16. The method according to claim 15, wherein the second tier average is based upon a second predetermined range of independent variables that is smaller than the first predetermined range of independent variables and includes at least one independent variable that is in the first predetermined range of independent variables.

17. The method according to claim 16, wherein a third tier average is based upon a third predetermined range of independent variables that is smaller than the second predetermined range of independent variables and includes at least one independent variable from the second predetermined range of independent variables.

18. A method for filtering noisy data, the method comprising the steps of:
    collecting a parent data set from a torquing tool while torquing a fastener through a range of angles;
    processing the parent data set to calculate first derivatives between adjacent pairs of data;
    averaging first derivatives within a first specified angle span to generate a first derivative average;
    determining a rate of change between the first derivative average associated with the current angle and a first derivative average associated with a previous angle to generate a second derivative of torque based on point-to-point slope between adjacent first derivative averages;
    averaging second derivatives within a second specified angle span associated with a current angle to generate a second derivative average;
    comparing the resulting second derivative average to a second derivative threshold value;
    determining that the process of finding a seating point of a clamped joint has been completed if the second derivative average is greater than the second derivative threshold value;
    determining, if the second derivative average is greater than the second derivative threshold value, a seating point by interpolating between the second derivative average and the first derivative average; and
    ceasing a tightening of the clamped joint or applying an additional predetermined amount of tightening after confirming that the threshold value has been reached.

* * * * *